United States Patent [19]
Van Dalen et al.

[11] 3,713,215
[45] Jan. 30, 1973

[54] WIRE STRIPPER AND CUTTER

[75] Inventors: Leonard Van Dalen, Cherry Hill; George S. Gadren, Oaklyn, both of N.J.

[73] Assignee: Seaboard Fabricators, Inc., Cherry Hill, N.J.

[22] Filed: June 1, 1971

[21] Appl. No.: 148,411

Related U.S. Application Data

[63] Continuation-in-part of Ser. No. 57,095, July 22, 1970, Pat. No. 3,636,798.

[52] U.S. Cl. ........................................ 30/90.1, 7/14.1
[51] Int. Cl. ................................................ H02g 1/12
[58] Field of Search ...81/9.5 R, 9.5 C; 30/90.1, 91.2; 7/14.1, 1 F

[56] References Cited

UNITED STATES PATENTS

| | | | |
|---|---|---|---|
| 3,636,798 | 1/1972 | Van Dalen | 81/9.5 R |
| 2,770,989 | 11/1956 | Bologno | 81/9.5 R |
| 3,114,277 | 12/1963 | Clendenin | 30/90.1 |

*Primary Examiner*—Granville Y. Custer, Jr.
*Assistant Examiner*—Roscoe V. Parker, Jr.
*Attorney*—Robert K. Youtie

[57] ABSTRACT

A shank having a handle fixed on one end and a tubular part slidably telescoped on the other end, with coacting cutting edges on the shank and tube for stripping and cutting wire. Carried on the shank between the handle and tube is an adjustable stop member for limiting engagement with a formation of the tube for operation on different sizes of wire.

5 Claims, 8 Drawing Figures

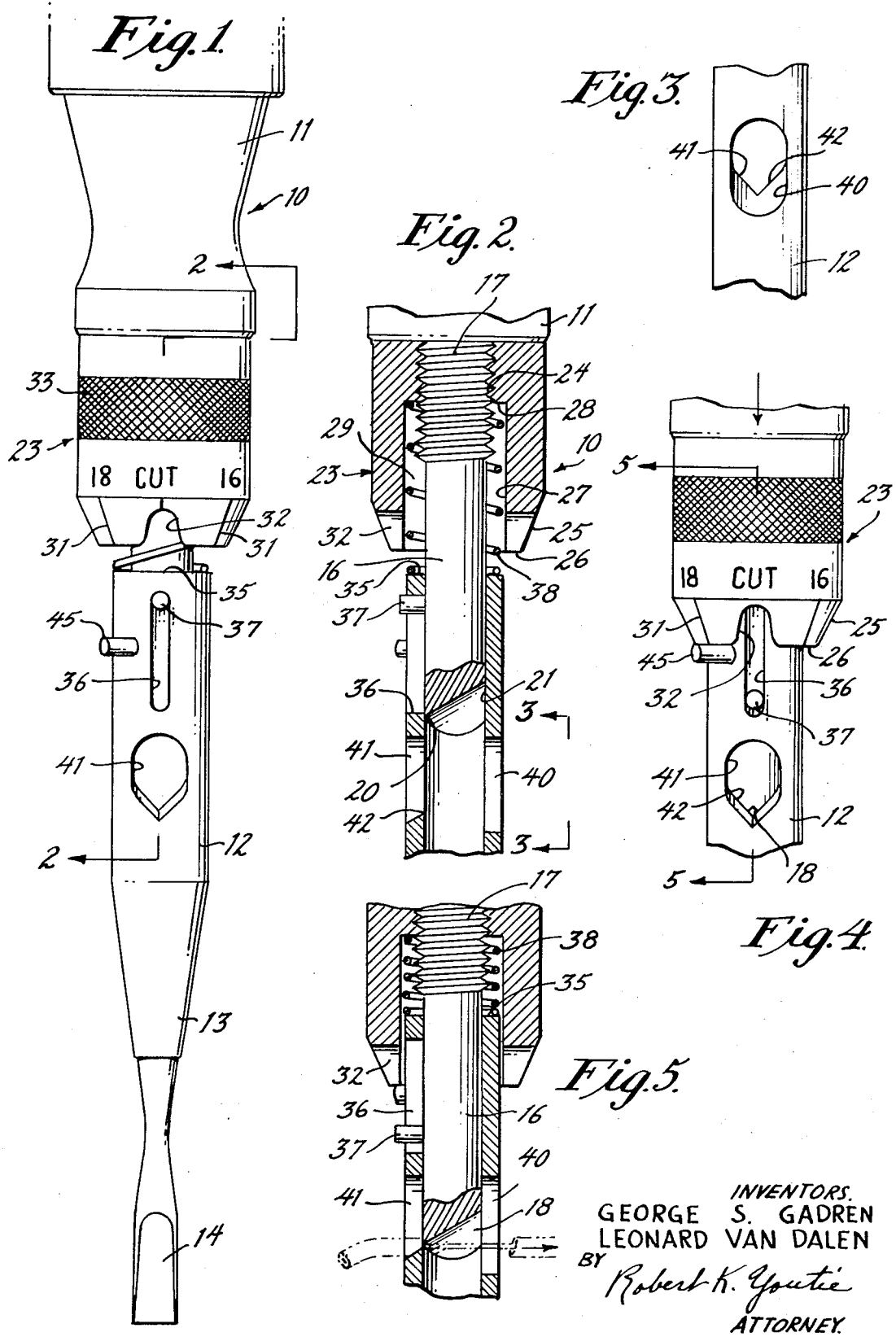

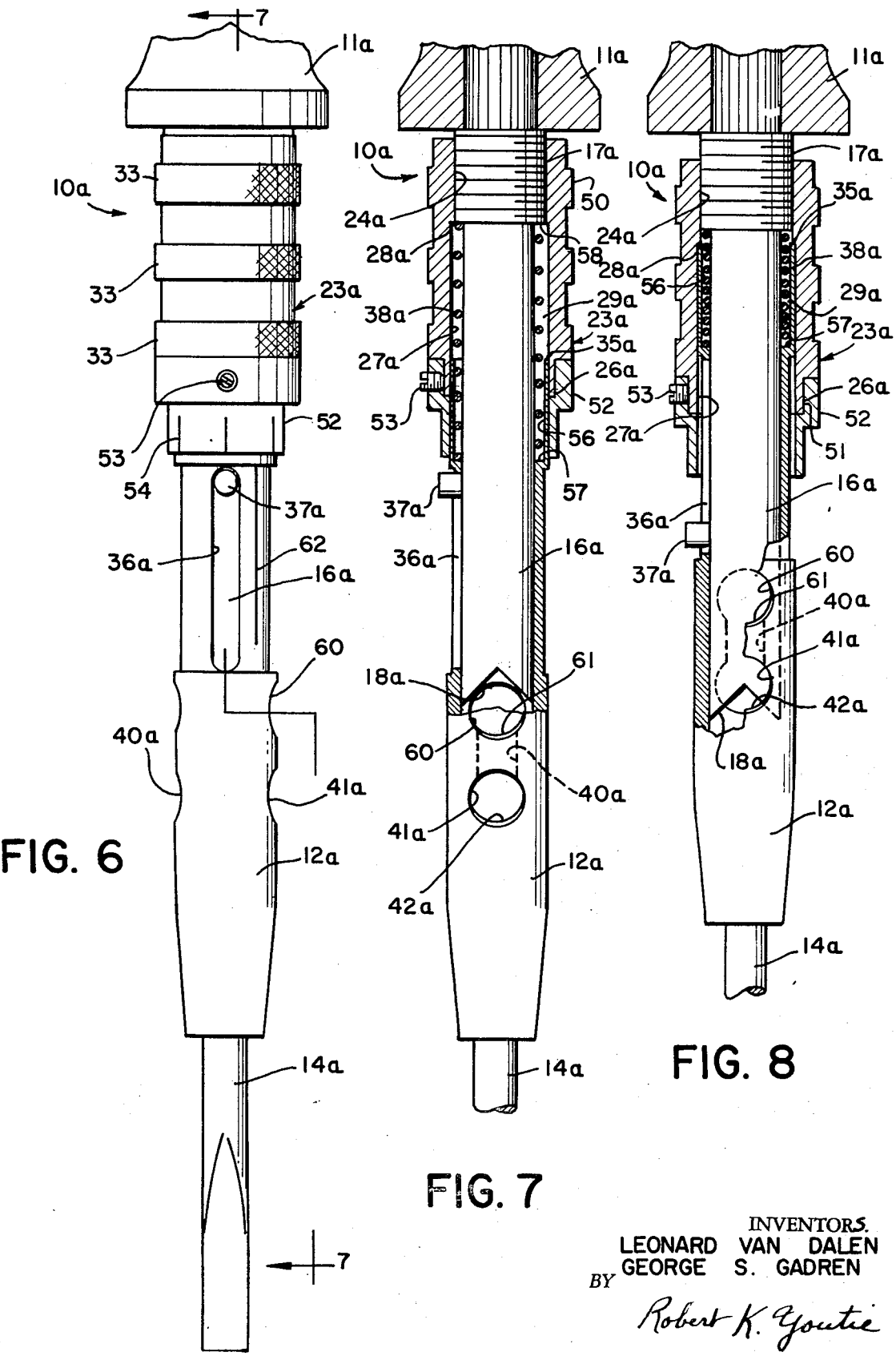

3,713,215

WIRE STRIPPER AND CUTTER

CROSS-REFERENCES TO RELATED APPLICATIONS

This application is a Continuation-in-Part of our copending U.S. Patent application Ser. No. 57,095, filed July 22, 1970 and entitled WIRE STRIPPER AND CUTTER and now U.S. Pat. No. 3,636,798.

BACKGROUND OF THE INVENTION

While there have, in the past, been proposed various devices for cutting and/or stripping wire, such devices have not been entirely satisfactory for many reasons, and therefore have not met wide general acceptance. For example, prior wire strippers and/or cutters were lacking in versatility for operation on a wide variety of wire sizes, and when usable on different sizes of wire were inconvenient to adjust or limited in range. Further, prior wire stripping and cutting devices being convenient as cutters were inaccurate and required a high degree of skill and experience for use as strippers.

SUMMARY OF THE INVENTION

Accordingly, it is an important object of the present invention to provide a combination wire stripper and cutter which overcomes the above-mentioned difficulties, is extremely simple to use even by persons of little or no experience and skill, capable of use throughout a wide range of wire sizes, and which is quickly and accurately adjustable to any selected size of wire within the range.

It is a further object of the present invention to provide a wire stripper and cutter having the advantageous characteristics mentioned in the preceding paragraph, which is extremely simple in construction, durable and reliable throughout a long useful life, and which is capable of economic mass production for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a partial longitudinal elevation illustrating a wire stripper and cutter constructed in accordance with the teachings of the present invention, in an inoperative or rest condition.

FIG. 2 is a partial longitudinal sectional view taken generally along the line 2—2 of FIG. 1, illustrating the rest position.

FIG. 3 is a partial longitudinal view taken generally along the line 3—3 of FIG. 2.

FIG. 4 is a partial longitudinal view similar to FIG. 1, but illustrating the stripping position of the tool for operation on wire size No. 18.

FIG. 5 is a longitudinal sectional view taken generally along the line 5—5 of FIG. 4, and illustrating, in phantom, a wire being stripped.

FIG. 6 is a partial longitudinal view showing a slightly modified embodiment of device of the present invention in an inoperative condition.

FIG. 7 is a longitudinal sectional view generally along the line 7—7 of FIG. 6.

FIG. 8 is a longitudinal sectional view similar to FIG. 7, but illustrating a wire stripping position.

DESCRIPTION OF THE PREFERRED EMBODIMENTS

Referring now more particularly to the drawings, and specifically to FIGS. 1–5 thereof, a wire stripper and cutter of the present invention is generally designated 10 in FIG. 1, being shown therein as including at one end a hand grip or handle 11 to be grasped by a user, and a tubular member 12 at the other end having its distal portion tapering, as at 13, and provided therein with a longitudinally outwardly extending blade 14, which may be of a screwdriver type.

Considering the internal structure of the device 10, as seen in FIG. 2, a rigid rod or shank of generally straight, cylindrical configuration is designated 16, and has one end fixedly secured to the handle 11. The rigid shank or rod 16 may be provided externally thereabout in the region adjacent to handle 11 with screw threads, as at 17, while the opposite, distal end of shank 16 may be formed with a diametrically extending, open ended, generally V-shaped groove 18, which is disposed obliquely or diagonally with respect to the axis of the shank. That is, the groove 18 of V-shape has one edge region 20 defined by an acute angle, while its other edge region 21 is defined by an obtuse angle. Thus, the end edge 20 of the V-shaped notch or cutout 18 may be considered as a cutting edge, as will appear hereinafter in greater detail.

Circumposed about the shank 16 is a stop member, generally designated 23, which may assume the form of a generally cylindrical sleeve or collar. The collar or stop member 23 may be internally threaded, as at 24 for threaded circumposed engagement about the shank thread 17, whereby the stop member or collar is axially displaceable along the shank 16 upon rotation thereof in threaded engagement with the shank.

The cylindrical collar, sleeve or stop member 23 has its lower end, as seen in the drawing, externally tapering, as at 25, to terminate in an end edge 26 of reduced thickness. Further, the stop member or collar 23 may be internally recessed or cut away, as at 27 internally in a cylindrical formation from the end edge 26 to terminate in an internal end wall 28. Thus, the lower end region of stop member or collar 23 is disposed in spaced relation about the shank 26, to leave an annular opening or space 29 between the shank and collar.

Adjacent to the lower, reduced end edge 26 of the annular collar or stop member 23, there are provided externally thereon a series of numerical markings, each having associated therewith an indicator or line, as at 31, the markings representing wire sizes, as will appear presently. Between certain of the wire size markings the annular stop member or collar 23 is externally marked with terminology, such as the word "CUT." In adjacent relation with each such word marking, longitudinally of the collar, the edge region 25 is notched or cut away, as at 32, so as to open downwardly through the collar end edge 26. If desired, suitable frictional grasping means 33, such as knurling, may be provided externally on the stop member 23.

The tubular member 12 is slidably telescoped over the lower, free end of shank 16, the upper open end 35 of the tube 12 receiving the shank 16 and being slidable thereon for entry into and withdrawal from the recess or annular opening 29 within the stop member 23. A longitudinal slot, as at 36, may be formed in the tube 12, slidably receiving a radially projecting pin, lug or constraining member 37 fixed to the shank 16. In this manner, the tube 12 is limited to longitudinal sliding movement on the shank of a predetermined magnitude. Also, suitable resilient means, such as coil compression spring 38, amy be employed to resiliently urge the tube 12 toward its longitudinally outward limiting position with respect to the shank 16. That is, the coil spring 38 is circumposed about the shank, being located in the space 29 and having its opposite ends respectively engaging the interior collar end wall 28, and the tube end wall 35, so as to resiliently and yieldably urge the tube to its outer limiting position with the pin 37 engaging the upper end of its receiving slot 36.

The tube 12 is formed at a location spaced below the slot 36, with a pair of diametrically opposed through holes 40 and 41, which combine with the hollow interior of the tube to define a diametrically extending passageway through the tube. Further, the tube openings or holes 40 and 41 are respectively located adjacent to the end edges 21 and 20 of the V-shaped notch 18. This condition is well illustrated in FIGS. 2 and 5. It will also there be seen that the upwardly facing, lower edge region of opening 41 is inclined inwardly to form an acute angle or cutting edge 42 for cooperative shearing coaction with the shank edge 20. Also, as seen in FIGS. 3 and 4, the upwardly extending cutting edge 42 of hole 41 is configured in the shape of an upright V, for unique coaction with the inverted V-shaped configuration of notch 18, in a manner of a rectangular opening, as seen in FIG. 4.

Carried externally on the tube 12 may be a radially projecting pin, lug or other abutment means, as at 45, which is movable with the tube 12 into limiting abutting engagement with the stop member 23, as will appear more fully presently.

One mode of operation of the instant device 10 is illustrated in FIGS. 1-5. It will there will seen that the annular collar or stop member 23 has been rotated about its threaded shank 16 to an uppermost position with the wire size marking 018 in longitudinal alignment with abutment means 45. The tube 12 may then be telescopically retracted or shifted upward to the position of FIG. 4 with the abutment means 45 engaging the lower edge 26 of stop member 23. In this condition, the coacting cutting edges 20 and 42 combine to define a generally rectangular through opening, as seen in FIG. 4. This through opening is sized to permit passage therethrough of a wire conductor size No. 18, but not to permit passage therethrough of the wire insulation. Thus, as seen in FIG. 5, a wire of size No. 18 passed through openings 40 and 41, may be stripped by telescopic retraction of tube 12, and removal of the severed insulation.

When it is desired to cut or sever a wire completely through, it is only necessary to rotate the stop member to align the abutment means 45 with one of the "cut" notches 32. Retraction of the tube 12, as by manual depression of the handle 11 with the blade 14 against a resisting surface, then serves to completely close the opening or hole 41 by the shank 12, while leaving the hole or opening 40 partially open to removal therethrough of a severed wire portion.

It will be appreciated that the annular stop member 23 may be rotated into position away from the handle 11, say to locate the marking "12" in alignment with the abutment means 45. By this adjustment, the tube 12 is further limited against upward or retracting movement relative to the shaft 16 for stripping of relatively large size wire.

Referring now to the embodiment of FIGS. 6-8, there is a modified embodiment of wire stripper and cutter in accordance with the present invention, there gradually designated 10a, including at one end a hand grip or handle 11a, and a tubular member 12a at the other end having its distal portion tapering and provided with a longitudinally outwardly extending blade 14a.

As seen in FIG. 7, a rigid rod or shank of generally straight, cylindrical configuration is designated 16a and has one end fixedly secured to the handle 11a, as by being embedded therein. The rigid shank or rod 16a may be provided externally there about in the region adjacent to the handle 11a with screw threads, as at 17a, while the opposite or distal end of the shank may be formed with a diametrically extending, open ended, generally V-shaped groove 18a. The groove 18a extends obliquely or diagonally with respect to the axis of shank 16a, in the manner of groove 18 of the first described embodiment. Thus, the groove 18a defines, at its opposite ends, with the adjacent regions of the shank 16a, respective acute and obtuse angles.

Circumposed about the shank 16a is a stop member, generally designated 23a, which may assume the form of a generally cylindrical sleeve or collar, and may have its upper portion internally threaded, as at 24a for threaded circumposition about the shank thread 17a. The circumferentially extending cylindrical sleeve, collar or stop member 23a is thereby axially displaceable along the shank 16a upon rotation in threaded engagement with the shank.

The cylindrical stop member 23a may be provided at spaced locations there along with a plurality of annular lands, as at 50, which may be knurled, or otherwise finished, for convenient manipulation to rotate the stop member relative to the handle 11a and shank 16a. The lower or distal end region of the cylindrical stop member or sleeve 23a may be reduced, as at 51, and a calibrated annulus or collar 52 may be snugly circumposed about the reduced stop member region 51, being rotatably adjustable relative thereto and secured in any selected position of adjustment, as by a set screw 53 or other suitable securing means. As best seen in FIG. 6, the ring 52 is provided externally about its lower or outer end edge with a series of calibrations or markings, such as lines 54, each carrying a numerical marking corresponding to a different size wire gauge.

Further, the cylindrical stop member 23a is internally recessed or cut away, as at 27a, in a cylindrical formation from the lower edge 26a to terminate in an internal end wall, abutment or surface 28a.

The tubular member 12a is slidably telescoped over the lower, free end of shank 16a, the upper open end 35a of the tube receiving the shank and being slidable thereon within the recess or annular opening 29a within the stop member 23a. A longitudinal slot, as at 36a, may be formed in the tube 12a, slidably receiving a longitudinally projecting pin, lug or constraining member 37a fixed to the shank 16a. In this manner, the tube 12a is limited to longitudinal sliding movement on the shank of a predetermined magnitude. Suitable resilient means, such as a coil compression spring 38a, may be employed to resiliently urge the tube 12a toward its longitudinally outward limited position with respect to the shank 16, with the pin 37a engaging the upper end of slot 36a. The tube 12a may be provided with an internally enlarged upper end portion 56 slidably received in the space 29a and receiving the lower end portion of coil compression spring 38a. It is the enlarged upper end portion or spring receiving sleeve portion 56 of the tube 12a which terminates in the upper tube end 35a. Interiorly, the enlarged upper tube end portion or sleeve 56 is formed with an annular, upwardly facing shoulder or ledge 57. The upper or inner end portion 17a of the shank 16a may be radially enlarged, so as to define an annular, circumferentially extending, downwardly or outwardly facing shoulder or ledge 58, which shoulder is in spaced facing relation with respect to the internal shoulder 57 of tube 12a.

The coil compression spring 38a, being circumposed about the shank 16a, has its opposite ends respectively engaging the tube shoulder 57 and the shank shoulder 58, so as to resiliently and yieldably urge the tube to its outer limiting position.

The tube 12a is formed at a location spaced below the slot 36a, with an upper cutting hole 60 and a lower stripping hole 41a. The upper and lower hole 60 and 41a may be on the same side of and in alignment with each other longitudinally of the tube, each having its lower region formed with a knife edge, as at 42a and 61. Diametrically opposite to the longitudinally spaced holes 60 and 41a, the tube 12a is formed with a single elongate hole 40a diametrically opposed to both of the holes 60 and 41a.

The holes 60 and 41a are located in the tube 12a proximate to the acute angle cutting edge of notch 18a for shearing coaction therewith. Upon relative telescopic retraction of tube 12a against the action of coil spring 38a, the cutting edge 61 of inner holes 60 will cooperate with the notch 18a to completely sever a wire located in the hole. However, the amount of retractile movement of tube 12a may selectively limited, so that an insulated wire located in hole 41a will have its insulation cut, without complete severance of the wire, for removal or stripping of the cut insulation. Obviously, the elongate diametrically opposed hole 40a may serve to discharge or pass outwardly a severed wire portion or stripped insulation. The partial severing or stripping operation is illustrated in the position of the device shown in FIG. 8.

It will there be seen that the tube 12a has been telescopically urged inwardly against the resilient force of spring 38a, until the tube end edge 35a abuts or bottoms against the internal shoulder 28a of the cylindrical stop member 23a. This limits the amount of telescopic retraction of tube 12a to that illustrated. This telescopic retracting movement is selectively achieved by rotation of the stop member 23a to longitudinally shift the latter relative to the shank 16a. In order to predetermine the limiting amount of telescopic retraction of tube 12a, an indicator marking 62 may be provided on the tube, such as a longitudinal line, terminating adjacent to the calibrated annulus 52. The calibrated annulus 52 may be rotated, together with the stop member 23a, to locate a desired calibration 54 in alignment with the indicator 62. The calibration 54 is numerically marked to indicate the size of wire to be stripped in hole 41a. In manufacture, to accommodate to manufacturing tolerances, the annulus 52 may be set to its desired circumferential position on the stop member 23a as a final assembly operation, with a standard gauge thickness in the hole 60, for extremely accurate calibration without requiring precision manufacturing tolerances.

While the stop members 23 and 23a of the different embodiments described herein have been illustrated as being axially movable on the shank 16a, it is appreciated that stop members may be rotatable without axial movement, and be provided with a suitably configured edge surface, shoulder or cam limiting telescopic tube retraction according to the angular position of the rotatable stop member.

From the foregoing, it is seen that the present invention provides a wire stripper and cutter which is well adapted to meet practical conditions of manufacture, distribution and use, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A wire cutter and stripper comprising a shank, a handle fixed to one end of said shank, a cutting edge on the other end of said shank, a tube disposed longitudinally of and slidably circumposed about said shank having one end extending beyond said cutter, said tube having a pair of diametrically opposed holes combining to define a through opening, a complementary cutting edge on the bounding edge of one of said holes for shearing cooperation with said shank cutting edge upon sliding movement of said tube, a stop member rotatably circumposed about said shank intermediate said handle and tube for selective rotative adjustment, and abutment means on said tube for limiting engagement with said stop member to control the depth of shearing cooperation between said cutting edges, said stop member comprising an annular collar having a shoulder in facing relation with the adjacent end edge of said tube, said end edge being abuttingly engageable with said shoulder and defining said abutment means.

2. A wire cutter and stripper according to claim 1, in combination with a calibrating ring circumposed about said collar for rotation therewith, said tube being provided with an indicator marking for indicating on said ring a wire size to be stripped.

3. A wire cutter and stripper according to claim 2, said calibrating ring being adjustably fixed on said collar for accurate calibration.

4. A wire cutter and stripper according to claim 1, said shoulder being internally of said collar.

5. A wire cutter and stripper comprising a shank, a handle fixed to one end of said shank, a cutting edge on the other end of said shank, a tube disposed longitudinally of and slidably circumposed about said shank having one end extending beyond said cutter, said tube having a pair of diametrically opposed holes combining to define a through opening, a complementary cutting edge on the bounding edge of one of said holes for shearing cooperation with said shank cutting edge upon sliding movement of said tube, a stop member rotatably circumposed about said shank intermediate said handle and tube for selective rotative adjustment, and abutment means on said tube for limiting engagement with said stop member to control the depth of shearing cooperation between said cutting edges, said tube having an additional hole spaced inwardly of one of said first mentioned holes, an additional knife edge on said additional hole for shearing cooperation with said cutting edge upon sliding movement of said tube to a controlled depth of shearing cooperation with said first mentioned cutting edge.

* * * * *